United States Patent Office 2,957,264
Patented Oct. 25, 1960

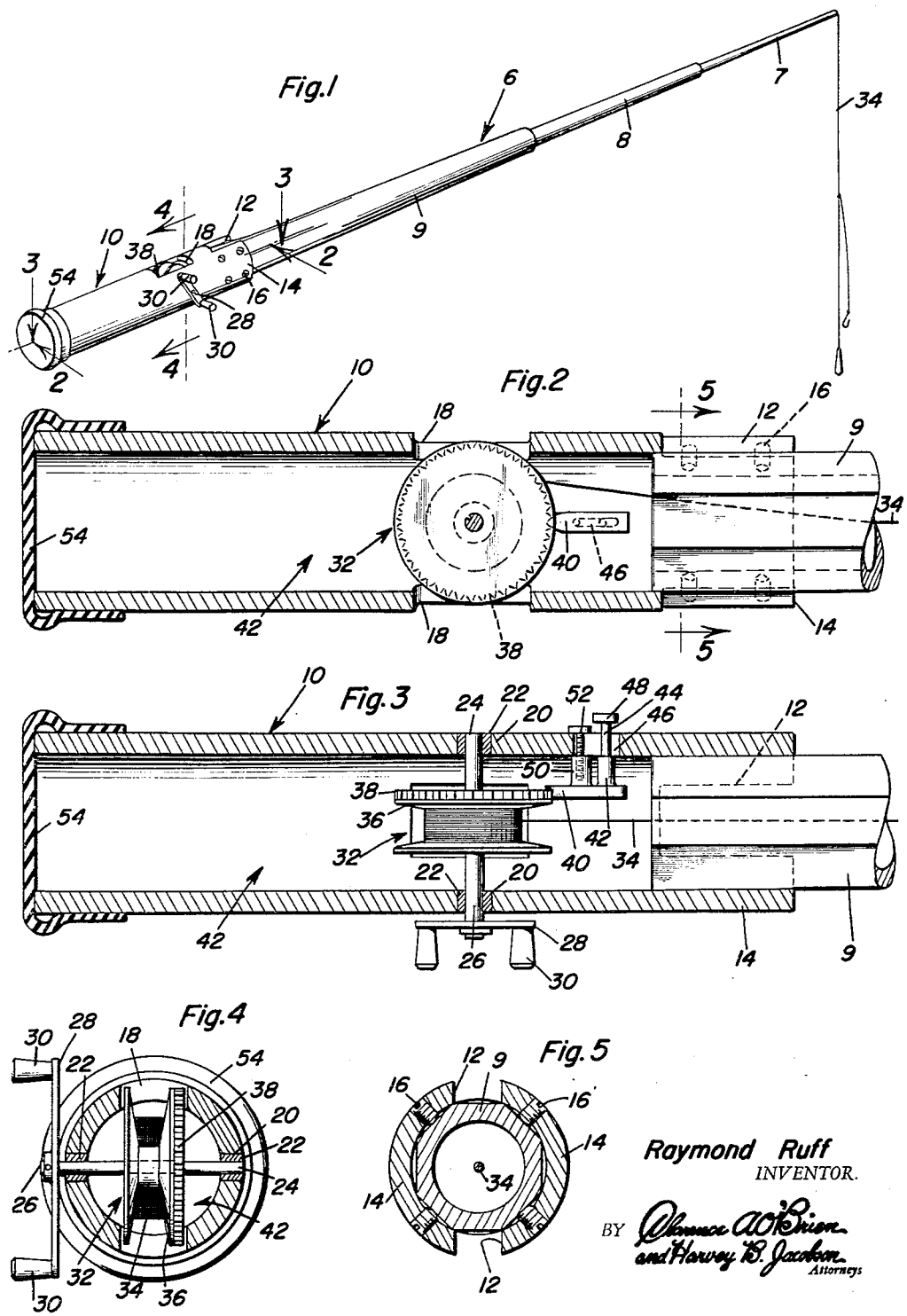

2,957,264

HOLLOW GLASS FISHING POLE WITH LINE STORING REEL

Raymond Ruff, 2109 Broadway, East Chicago, Ind.

Filed Oct. 21, 1957, Ser. No. 691,342

2 Claims. (Cl. 43—20)

This invention relates to a novel handle having a line winding and storing reel and wherein said handle is constructed for attachment to the inner end portion of a well-known type of still fishing pole or rod, usually designated in the trade and art as a hollow collapsible or telescopic pole.

As is also well-known, there are many different makes of so-called hollow glass and plastic fishing poles on the market primarily used for still fishing. However, most users of such poles find it difficult to properly mount the line on the pole for the reason that the user invariably desires to lengthen and shorten the line, particularly when collapsing the pole to its compact storing and carrying form. With a view toward mounting the reel effectually so that the line may function to best advantage a simple and practical reel-equipped handle or hand-grip has been devised.

More specifically, the invention pertains to an attachment characterized by a tubular open-ended handle the attachable end of which is bifurcated to provide furcations to straddle said inner end portion, said furcations having set-screws, the median portion of said handle having a pair of diametrically opposite slots and a pair of diametrically opposite bearing-holes, the latter being in a plane at right angles to said slots, a line winding and storing reel confined for the most part in the chamber of said handle and having marginal portions projecting for rotary guided operation into said slots, said reel having a shaft spanning the chamber with its end portions mounted for rotation in said bearing holes, one end of the shaft projecting and being exposed and provided with a turning handle, said reel having a cog wheel, a retaining latch in the chamber releasably engageable with said cog wheel, and operating and fastening means carried by said latch and slidingly mounted in a slot provided therefor in one side of the handle adjacent to said reel.

Other objects features and advantages will become evident from the drawing and accompanying specification.

In the drawing:

Fig. 1 is a perspective view of the improved reel-equipped handle or attachment mounted for use on a hollow collapsible fishing pole;

Fig. 2 is a fragmentary view enlarged and taken on the plane of the line 2—2 of Figure 1;

Fig. 3 is a similar view taken on the line 3—3 of Fig. 1;

Fig. 4 is an enlarged cross-section on the line 4—4 of Fig. 1; and,

Fig. 5 is a cross section on the line 5—5 of Fig. 2.

The sectional "glass" or equivalent still fishing pole is denoted in Fig. 1 by the numeral 6 and comprises the usual progressively diminished telescopically connected sections 7, 8 and 9. The attachment comprises a tubular open-ended handle or hand-grip 10 the forward end of which is bifurcated at 12 to provide diametrically opposite slightly resilient furcations or grips 14. These straddle and telescopically receive the end portion of the pole or rod as seen in Fig. 2 and they are fastened in place by set-screws 16. The median portion has a pair of diametrically opposite slots 18 (Fig. 2) and at right angles to the slots a pair of diametrically opposite holes 20 are provided and the holes are provided with bushings 22 forming bearings for the end portions 24 and 26 of the real shaft. The extended end portion 26 is provided with a crank 28 and suitable knobs or grips 30 to facilitate rotating the reel. The reel, as an entity is denoted by the numeral 32 and is more or less conventional to accommodate the fishing line 34. The head 36 is provided with a toothed wheel here called a cog wheel 38. The aforementioned retaining latch 40 is located in the space or chamber 42 of the handle and is shiftable toward and from the cog wheel and has a lateral socket member 42' carrying a stem 44 extending through a slot 46 and terminating in a finger-grip 48. This arrangement serves to permit the user to accessibly operate the latch. A similar lateral socket member 50 to accommodate the screw threaded shank of a set-screw 52 which also is operable in the slot 46 and engageable with the handle in a manner to "lock" the latch in either released or latching position.

It will be noticed in Fig. 4 that the reel is of a diameter so that the diametrically opposite portions actually project into and are partially sustained and guided by way of the slots 18. It follows that the thus stabilized reel is substantially confined in the chamber and in a satisfactory position so that the fishing line may be reeled in or paid out in proper operating alinement in respect to the passage or bore extending through the fishing pole 6. Consequently, as the sections 7, 8 and 9 are collapsed into compact form one may reel in the line and shorten it for easy handling, that is, while travelling or while storing the pole or rod away in a tackle box (not shown).

It will be evident that the attachment may be readily applied and removed and that it will satisfactorily mount both the reel and line in operative relationship with respect to the line passage or bore in the pole 6. If desired, a rubber cap or suitable equivalent closure 54 may be removably mounted on the left hand end portion of the handle.

Minor changes in shape, size, materials and rearrangement of parts may be resorted to in practice without departing from the spirit of the invention or the scope of the invention as claimed.

What is claimed as new is as follows:

1. An applicable and removable handle for attachment to an end portion of a section of a sectional-type hollow telescoping still fishing pole comprising a one-piece tubular open-ended handle the attachable forward end of which is bifurcated to provide furcations to straddle said inner end portion, said furcations having set-screws, the median portion of said handle having a pair of diametrically opposite slots and a pair of diametrically opposite bearing-holes, the latter being in a plane at right angles to said slots, a line winding and storing reel of a diameter slightly greater than the cross-section of the bore of said handle and confined for the most part in the chamber of said handle and having marginal portions projecting for rotation and guided operation into the respective slots, said reel having a shaft spanning the chamber with its end portions mounted for rotation in said bearing holes, one end of the shaft projecting and being exposed and provided with a turning handle, said reel having a pair of heads and one of said heads being provided with peripheral teeth defining a cog wheel, a retaining latch confined in the chamber releasably engageable with said cog wheel, and operating and fastening means carried by said latch and slidingly mounted in a slot provided therefor in one side of the handle adjacent to said reel.

2. An attachment for an inner end portion of a hollow fishing rod, a readily applicable and removable handle straight from end to end and open at opposite ends, a cap fitted over and removably mounted on and closing the rearward end of the handle, the forward end of the handle being constantly open for removable telescopic reception of an end portion of a hollow telescoping type fishing pole, diametrically opposite portions of an intermediate part of said handle being provided with a pair of reel accommodation slots registering with each other, there being an additional slot formed in a side of said handle and located between said reel accommodation slots and the forward end portion of the handle, a line spooling reel mounted for operation in the bore of said handle, said reel having a hub portion and heads at the ends of the hub portion, one head having peripheral teeth and providing a cog wheel, said reel being of a diameter slightly greater than the cross-section of the bore of said handle and also of a diameter slightly less than the outside diameter of said handle and diametrically opposite segmental portions of the periphery of the reel projecting into their respective accommodation slots and being partially sustained and guided by the lengthwise edge portions of the slots cooperating with the closely related marginal portions of the heads of the reel, a straight latch in line with said cog wheel and confined for operation in said bore and having an end portion movable toward and from and releasably engageable with the teeth of the cog wheel, means carried by said latch and slidably mounted in the aforementioned side slot and being accessible for adjustment and operation on the exterior of the handle, said means embodying a handle carried by and projecting laterally from said latch and having a grip portion operable in said side slot, and also embodying a separate lock, said lock being operable in the slot and accessible for use by way of said slot.

References Cited in the file of this patent

UNITED STATES PATENTS

| | | |
|---|---|---|
| 412,629 | Kepler | Oct. 8, 1889 |
| 1,285,679 | Glowacki | Nov. 26, 1918 |
| 1,544,128 | Budd et al. | June 30, 1925 |
| 2,276,524 | Taylor | Mar. 17, 1942 |
| 2,493,766 | Luton | Jan. 10, 1950 |
| 2,749,643 | Scott | June 12, 1956 |